A. M. HASWELL.
Hand Corn-Planter.

No. 212,929. Patented Mar. 4, 1879.

UNITED STATES PATENT OFFICE.

ALANSON M. HASWELL, OF NORTH SPRINGFIELD, MISSOURI.

IMPROVEMENT IN HAND CORN-PLANTERS.

Specification forming part of Letters Patent No. 212,929, dated March 4, 1879; application filed January 21, 1879.

*To all whom it may concern:*

Figure 1:
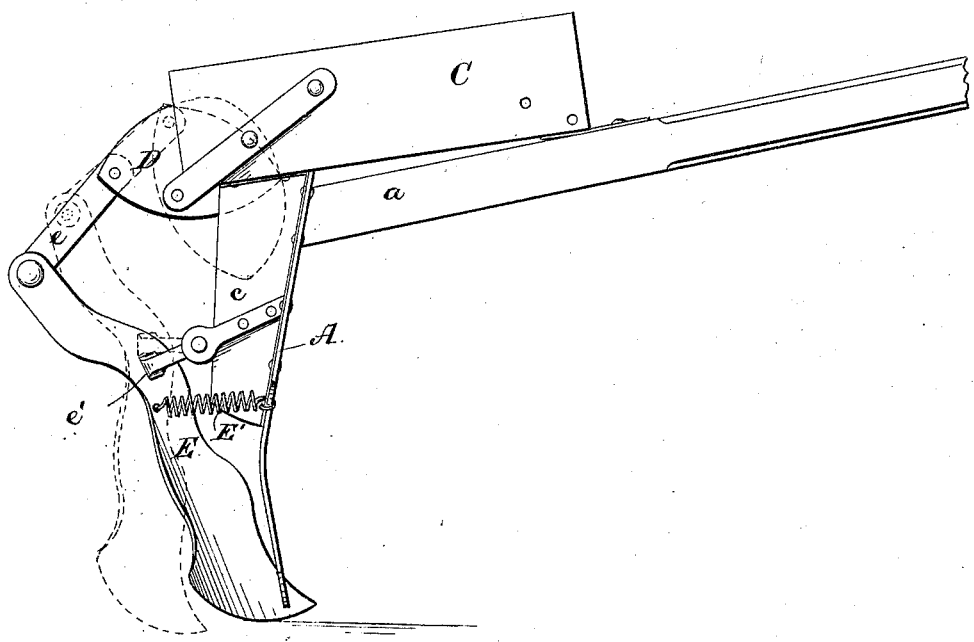
Figure 2:
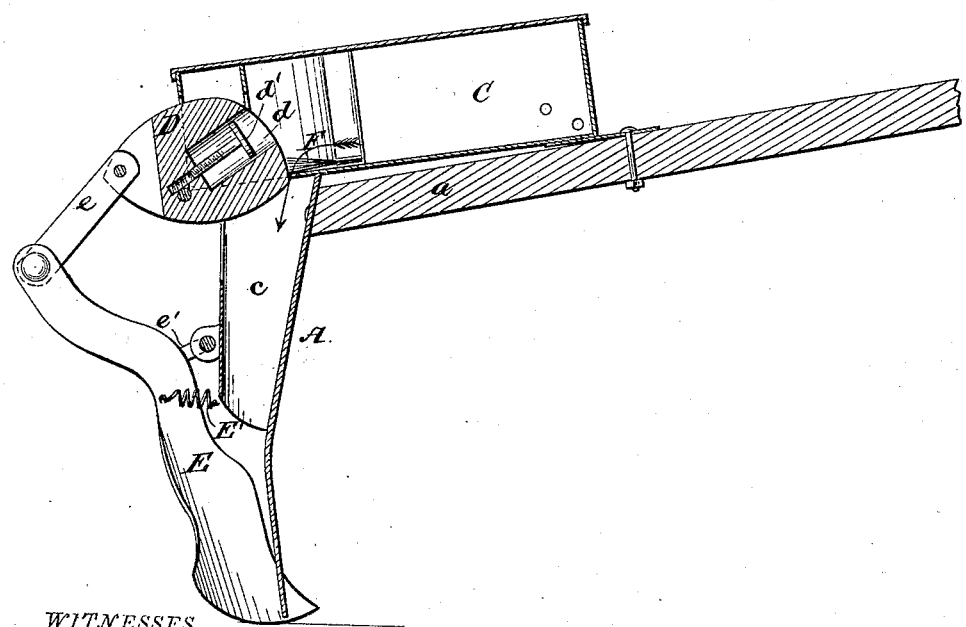

Be it known that I, ALANSON M. HASWELL, of North Springfield, in the county of Greene and State of Missouri, have invented certain new and useful Improvements in Hand Corn-Planters, of which the following is a specification:

Figure 1 is a side elevation of the seed-planter. Fig. 2 is a vertical central section of Fig. 1, showing the internal construction.

This invention relates to devices designed for planting corn or other seed; and the novelty consists in the special detail and combination of the several parts, whereby, in a compact form, are grouped in a single implement a hoe, a box or hopper for the seed, a seed dropper and coverer, with attachment adapted to act automatically, whereby the farmer can, in the ordinary use of the device, like as a hoe dig the furrow or hole for the seed, and plant and cover the same, all as will now be more fully set out and explained.

In the accompanying drawings, A denotes the hoe, and $a$ its handle. Suitably attached to or fixed upon the rear end of the handle, in proper relation to the hoe to enable it to perform its purposes, is the box or hopper C, of any shape and size. To the under side of said box or hopper C, and extending down the back of the hoe A, is the spout $c$, which, connecting at the upper end with the opening in the bottom of C, will, when said opening is uncovered, afford a way for the corn or seed to flow downward and out of the hopper.

This flow of the seed is regulated by the semi-rotary dropper D, which is hinged or pivoted to the rear of the hopper C. Said dropper may be fitted partly within an opening in the rear of the hopper, as now shown, or may be placed wholly within the case of the hopper, or arranged in any way that taste or skill may devise.

The semi-rotary movements of the dropper are caused by the operation of the covering-arm E, which, at its upper end, is suitably jointed by link $e$, or otherwise, to dropper D, and hinged at fulcrum $e'$ to the spout or the hoe by any proper means. When at rest the twisted or bent point or lower end of the said covering-arm will touch and overlap a little the edge of the hoe. Thus, when in use, the hoe edge or point is stuck into the ground, the lower end of said covering-arm E is thrown out, and this movement causes the dropper D to partially rotate. In this rotation the corn or seed which has fallen into the pocket or opening $d$ in the forward face of the dropper in its position of rest is emptied into the spout $c$, and following the course thus given it will quite certainly drop into the hole made by the hoe point or edge, as above described.

The depth of the pocket $d$ is regulated by means of a bottom, $d'$, adjustable by a screw. In this way the number of seeds discharged at each partial rotation of dropper D can be governed exactly.

The brush F on the bottom of the hopper C serves to take away the superfluous seed from the hole or pocket $d$ as the dropper turns to discharge its contents.

The retracting-spring E', attached to the covering-arm E below its fulcrum and to the hoe-blade, or in any convenient way to the fixed part of the device, serves to return the covering-arm to its position when the device is lifted from the ground. The lower end of said arm E is curved or twisted, which will cause it to throw back the earth displaced by the hoe and cover the corn which has fallen from the dropper into the hole made by the hoe, as aforesaid. The blade of the hoe is preferably bent or somewhat curved, so as to help guide the corn into the furrow or hole made by the hoe-point.

This device is very simple in structure, and can be made of any suitable materials, and very cheaply, and in a very neat and compact form. It will not easily get out of order, and can be readily repaired.

Having thus described my invention, what I consider new, and desire to secure by Letters Patent, is—

1. In a hand corn or seed planter, the combination of a hoe with a seed-hopper, a dropping mechanism, and a coverer adapted to operate the dropping mechanism automatically, substantially in the manner set forth.

2. In combination with hoe A $a$, having a curved or bent blade, the seed-hopper C, having brush F over the seed-exit hole, and spout $c$, movable covering-arm E, retracting-spring E', and semi-rotating dropper D, provided with pocket $d$, substantially as described.

3. In a hand corn-planter, as described, the combination of a hoe having a bent or curved blade with a hinged covering-arm provided with a spring and having a twisted point, substantially as and for the purposes set forth.

In testimony that I claim the foregoing as my own I affix my signature in presence of two witnesses.

ALANSON M. HASWELL.

Witnesses:
E. S. McLANE,
H. T. RAND.